United States Patent
Kawase et al.

(10) Patent No.: US 11,387,635 B2
(45) Date of Patent: Jul. 12, 2022

(54) WIRE HARNESS WIRING OPERATION SUPPORT SYSTEM

(71) Applicant: Hitachi Metals, Ltd., Tokyo (JP)

(72) Inventors: Kenji Kawase, Tokyo (JP); Masaru Ishikawa, Tokyo (JP); Katsuju Aoki, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 0 days.

(21) Appl. No.: 16/081,351

(22) PCT Filed: Mar. 1, 2016

(86) PCT No.: PCT/JP2016/056233
§ 371 (c)(1),
(2) Date: Aug. 30, 2018

(87) PCT Pub. No.: WO2017/149652
PCT Pub. Date: Sep. 8, 2017

(65) Prior Publication Data
US 2019/0067919 A1 Feb. 28, 2019

(51) Int. Cl.
*G06F 30/15* (2020.01)
*B60R 16/02* (2006.01)
(Continued)

(52) U.S. Cl.
CPC ........... *H02G 1/06* (2013.01); *B60R 16/0207* (2013.01); *G06F 3/02* (2013.01); *G06F 30/00* (2020.01);
(Continued)

(58) Field of Classification Search
CPC ...... G06F 2113/16; G06F 30/18; G06F 30/20; G06F 30/12; G06F 30/15; G06F 30/394;
(Continued)

(56) References Cited

U.S. PATENT DOCUMENTS 6,272,387 B1 * 8/2001 Yoon ................ B60R 16/0207
700/17
6,438,435 B1 * 8/2002 Wada .................... H01R 43/28
700/17
(Continued)

FOREIGN PATENT DOCUMENTS

EP 2 528 001 A2 11/2012
JP 2000-195352 A 7/2000
(Continued)

OTHER PUBLICATIONS

Japanese Office Action, dated Feb. 22, 2019, in Japanese Application No. 2618-071998 and English Translation thereof.
(Continued)

*Primary Examiner* — Dismery Mercedes
(74) *Attorney, Agent, or Firm* — McGinn IP Law Group, PLLC

(57) ABSTRACT

A wire harness wiring operation support system includes a display section that includes a procedure display region for displaying a plurality of wiring procedure selection buttons corresponding a wire harness to be wired, and a wiring position display region for displaying a wiring position of the wire harness that corresponds to the selected wiring procedure selection button.

15 Claims, 3 Drawing Sheets

(51) Int. Cl.
  *G06F 30/00* (2020.01)
  *H02G 1/06* (2006.01)
  *G06F 30/12* (2020.01)
  *G06F 3/02* (2006.01)
  *G09B 5/02* (2006.01)
  *G09B 19/00* (2006.01)
  *G06F 113/16* (2020.01)
  *G06F 111/18* (2020.01)

(52) U.S. Cl.
  CPC .............. *G06F 30/12* (2020.01); *G06F 30/15* (2020.01); *G09B 5/02* (2013.01); *G09B 19/0069* (2013.01); *G06F 2111/18* (2020.01); *G06F 2113/16* (2020.01)

(58) Field of Classification Search
  CPC .......... G06F 30/00; G06F 30/13; G06F 30/12; G06F 8/34; G06F 2111/02; H02G 1/06; H02G 1/00; B60R 16/0207
  See application file for complete search history.

(56) References Cited

U.S. PATENT DOCUMENTS

| | | | | |
|---|---|---|---|---|
| 6,457,165 | B1* | 9/2002 | Ishikawa | G06F 30/18 716/126 |
| 7,558,705 | B1* | 7/2009 | Hughes | G06F 30/18 703/1 |
| 8,159,346 | B2* | 4/2012 | Yokota | G06Q 50/04 340/572.1 |
| 8,274,511 | B2* | 9/2012 | Sato | G06F 30/15 345/420 |
| 9,818,179 | B2* | 11/2017 | Philbert | G06T 7/0004 |
| 10,114,365 | B2* | 10/2018 | Saki | G06F 30/18 |
| 10,679,776 | B2* | 6/2020 | Kawase | B23D 33/006 |
| 2003/0020711 | A1* | 1/2003 | Sakakura | B60R 16/0207 345/420 |
| 2003/0023947 | A1* | 1/2003 | Sakakura | G06F 30/15 716/126 |
| 2003/0050723 | A1* | 3/2003 | Ozaki | B60R 16/0207 700/97 |
| 2003/0163917 | A1* | 9/2003 | Davidshofer | H01B 13/01227 29/854 |
| 2005/0183052 | A1* | 8/2005 | Ash-Rafzadeh | G06F 30/00 716/126 |
| 2007/0102505 | A1* | 5/2007 | Yokota | G06Q 50/04 235/375 |
| 2007/0277372 | A1* | 12/2007 | Aida | H01R 43/28 29/747 |
| 2008/0172722 | A1 | 7/2008 | Fujita et al. | |
| 2009/0146997 | A1* | 6/2009 | Sato | G06F 30/15 345/419 |
| 2010/0146466 | A1* | 6/2010 | Hadley | G06F 30/15 716/111 |
| 2011/0196655 | A1* | 8/2011 | Sharma | G06F 30/15 703/1 |
| 2012/0271596 | A1* | 10/2012 | Hadley | G06F 30/15 703/1 |
| 2012/0304105 | A1* | 11/2012 | Rosman LaFever | G06F 30/00 715/781 |
| 2015/0161781 | A1* | 6/2015 | Philbert | G06F 30/00 382/141 |
| 2015/0233992 | A1* | 8/2015 | Singh | G06F 30/18 702/58 |
| 2016/0064121 | A1* | 3/2016 | Rougier | H01B 13/01236 29/868 |
| 2016/0225492 | A1* | 8/2016 | Toyama | G06F 30/15 |
| 2016/0335800 | A1* | 11/2016 | DeStories | G02B 27/0172 |
| 2017/0185711 | A1* | 6/2017 | Fujiwara | G06F 17/5081 |
| 2018/0118293 | A1* | 5/2018 | Kato | H01R 13/465 |
| 2019/0118741 | A1* | 4/2019 | Kawase | B60R 16/0215 |

FOREIGN PATENT DOCUMENTS

| | | |
|---|---|---|
| JP | 2008-171186 A | 7/2008 |
| JP | 2009-104358 A | 5/2009 |
| JP | 2014-513358 A | 5/2014 |

OTHER PUBLICATIONS

Japanese Office Action, dated Dec. 19, 2017, in Japanese Application No. 2017-038657 and English Translation thereof.
Notification of Transmittal of Translation of the International Preliminary Report on Patentability (PCT Form PCT/IB/338), in PCT/JP2016/056233, dated Sep. 13, 2018.
International Search Report (ISR) (PCT Form PCT/ISA/210), in PCT/JP2016/056233, dated Apr. 19, 2016.
Extended European Search Report dated Nov. 6, 2019 for European Patent Application No. 16892497.5-1224.
Painless Performance Products Llc: "Wire Hardness Installation Instructions", Jan. 14, 2014 (Jan. 14, 2014), XP055633113, Retrieved from the Internet: URL: https//www.painlessperformance.com/Manuals/10123.pdf [retrieved on Oct. 17, 2019].
European Office Action, dated Jul. 6, 2021, in European Application No. 16 892 497.5.
Chinese Office Action, dated Sep. 27, 2021, in Chinese Application No. 201680082910.6 and English Translation thereof.

* cited by examiner

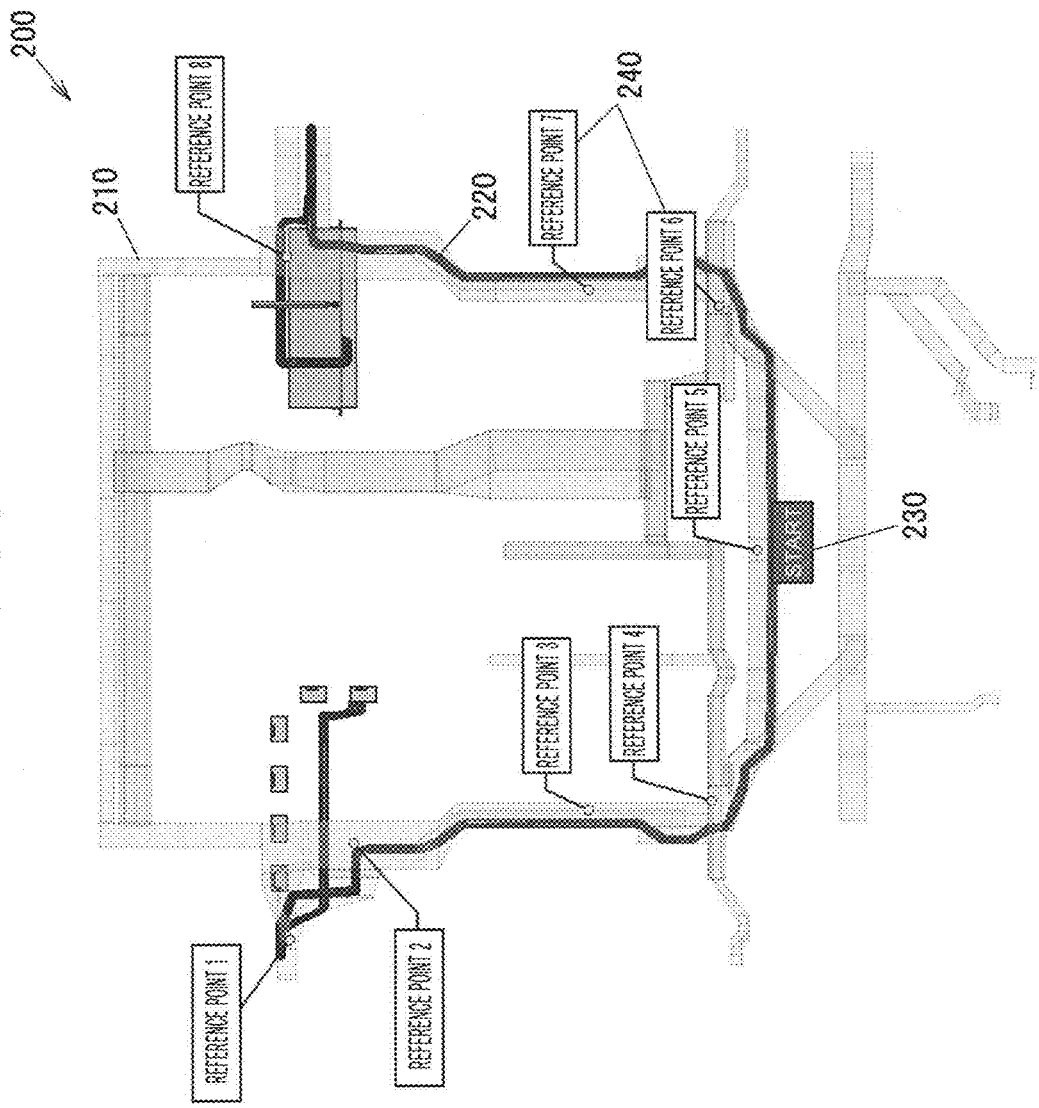

WIRE HARNESS WIRING OPERATION SUPPORT SYSTEM

TECHNICAL FIELD

The present invention relates to a wire harness wiring operation program.

BACKGROUND ART

A known wire harness assembly drawing board device for assembling wire harness has been proposed (see, e.g., JP 2000/195352 A).

This wire harness assembly drawing board device is provided with a wire laying board on which various jigs required for wire harness assembly can be arranged, assembly jigs which are attached to the wire laying board and hold electric wires to be laid, a screen arranged on the back side of the wire laying board, and an optical projector for projecting images required for wire harness assembly on a back surface of the screen.

CITATION LIST

Patent Literature

JP 2000/195352 A

SUMMARY OF INVENTION

Technical Problem

However, the known wire harness assembly drawing board device is designed for assembly of wire harness and thus cannot be used for wiring work. Thus, wiring work is carried out while looking at a wiring diagram.

In addition, wiring work in a large structure such as railway vehicle requires proficient skills and it takes long time to complete wire harness wiring operation.

Therefore, it is an object of the invention to provide a wire harness wiring operation program which makes it possible to quickly perform a wire harness wiring operation even without being proficient at the task.

Solution to Problem

[1] A wire harness wiring operation program that causes a computer to function as a display means and a selection means,
  wherein the display means displays, on a screen, a procedure display region for displaying wiring route numbers indicating the order of routes for wiring a wire harness and one or more wiring procedure selection buttons provided for each wiring route number so as to correspond to the order of procedure for wiring the wire harness and a wiring position display region for displaying a wiring position of the wire harness that corresponds to the selected wiring procedure selection button, and
  wherein the selection means notifies the display means of the selected wiring procedure selection button.

[2] The wire harness wiring operation program defined by [1], wherein the display means displays a virtual routing space showing all wiring routes of the wire harness in the wiring position display region and also displays the wiring route of the wire harness corresponding to the selected wiring procedure selection button so as to be superimposed on the corresponding position in the virtual routing space.

[3] The wire harness wiring operation program defined by [2], wherein, when displaying the wiring position of the wire harness so as to be superimposed on the corresponding position in the virtual routing space, the display means displays position identification information at a plurality of positions in a longitudinal direction of the wire harness for identification of said positions.

[4] The wire harness wiring operation program defined by [3], wherein, when displaying the wiring position of the wire harness so as to be superimposed on the corresponding position in the virtual routing space, the display means displays setting position information indicating a longitudinal position of the wire harness that should be set first.

Advantageous Effects of Invention

According to the invention, it is possible to quickly perform a wire harness wiring operation even without being proficient at the task.

BRIEF DESCRIPTION OF DRAWINGS

FIG. 3 is a diagram illustrating an example of work detail which should be undertaken in the wiring procedure "U10-1".

DESCRIPTION OF EMBODIMENTS

Embodiment

Figure 1:
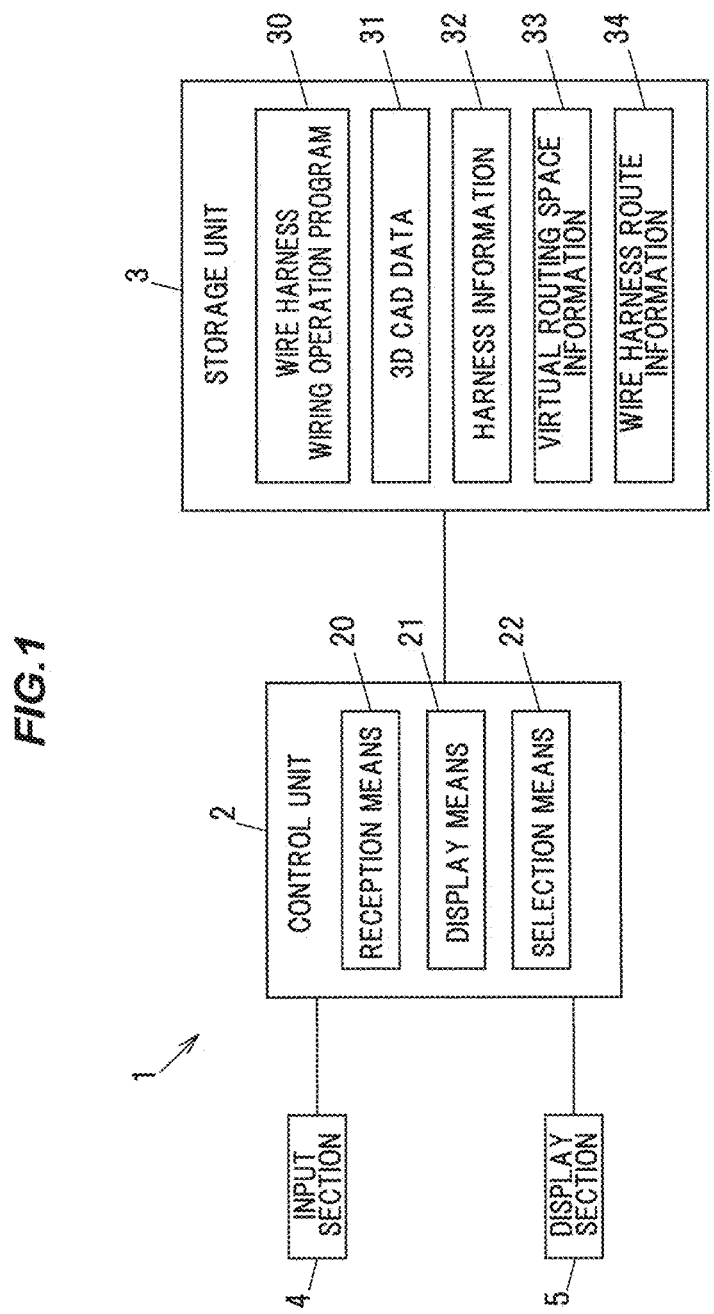
FIG. 1 is a schematic block diagram illustrating an example configuration of a wire harness wiring operation support system in an embodiment of the present invention.

An embodiment of the invention will be described below in reference to the drawings. Constituent elements having substantially the same functions are denoted by the same reference numerals in each drawing and the overlapping explanation thereof will be omitted.

FIG. 1 is a schematic block diagram illustrating an example configuration of a wire harness wiring operation support system in an embodiment of the invention.

A wire harness wiring operation support system 1 is provided with a control unit 2 which is constituted by using a CPU (Central Processing Unit), etc., to control each section of the wire harness wiring operation support system 1, a storage unit 3 for storing various information, an input section 4 realized by a computer keyboard, a computer mouse and a disc drive, etc., and a display section 5 realized by a liquid-crystal display, etc. As the wire harness wiring operation support system 1, it is possible to use, e.g., a mobile personal computer (PC). Meanwhile, it is possible to use a touch display in which the input section 4 and the display section 5 are integrated.

The storage unit 3 is constructed by using ROM (Read Only Memory), RAM (Random Access Memory) or a hard disc, etc., and stores wire harness wiring operation program 30 for CPU, 3D CAD data 31, harness information 32, virtual routing space information 33 and wire harness route information 34, etc.

The 3D CAD data 31 here is an example of three-dimensional information including shape information and position information of a main body, the interior construction of the main body and plural wiring parts, and is computer-readable data. The "main body" is a main body of a railway vehicle in the present embodiment but may be a main body of a land vehicle such as automobile or bus, or of another moving vehicle such as aircraft, or may be a main body which does not move. The "interior construction of the main body" includes, e.g., structural components such as framework, bogie, wheels and seats, and electrical equipment such as control panel, air conditioner and light fittings. The "wiring parts" are arranged along plural routes intended by a provider of the 3D CAD data 31 and are bundling members used to fix the wire harness. The concept of the "wire harness" includes a product in which plural electric wires are bundled and connecters or terminals for connection to a printed circuit board or device are attached to both ends of each electric wire, as well as a product in which plural electric wires are bundled but connecters or terminals for connection to a printed circuit board or device are not attached to both ends of each electric wire. In the present specification, the wire harness is defined to also include when provided with one electric wire.

The harness information 32 is information including model number of electric wire, diameter, connection destination and model number of connector of the wire harness to be laid in each route. The model number of electric wire is an example of the type of the electric wire.

The virtual routing space information 33 is three-dimensional information of a virtual routing space.

The wire harness route information 34 is information of the route of the wire harness. The wire harness route information 34 includes position information of plural harness passing points which are set along a longitudinal direction of the wire harness.

The CPU of the control unit 2 operates according to the wire harness wiring operation program 30 and thereby functions as a reception means 20, a display means 21 and a selection means 22, etc. All or some of the means 20 to 22 of the control unit 2 may be realized by a hardware such as ASIC (Application Specific Integrated Circuit).

The reception means 20 receives the 3D CAD data 31, the harness information 32, the virtual routing space information 33 and the wire harness route information 34, etc. Then, the reception means 20 stores the received 3D CAD data 31, harness information 32, virtual routing space information 33 and wire harness route information 34, etc., in the storage unit 3.

The display means 21 arranges a main body, the interior construction of the main body and plural wiring parts in a 3D virtual space based on the 3D CAD data 31 and displays them on a screen of the display section 5.

When the input section 4 is operated by a worker, the display means 21 displays the virtual routing space in the 3D virtual space so that the virtual routing space passes near the plural wiring parts displayed along the plural routes. A cross-sectional shape of the virtual routing space is a rectangular shape in this example but may be another shape such as oval shape or elliptical shape.

The display means 21 displays, on a screen of the display section 5, a procedure display region for displaying wiring route numbers indicating the wire harness wiring route order and one or more wiring procedure selection buttons provided for each wiring route number so as to correspond to the wire harness wiring procedure order, and a wiring position display region for displaying a wiring position of the wire harness which corresponds to the selected wiring procedure selection button.

The display means 21 displays the virtual routing space showing all wiring routes of the wire harness in the wiring position display region and also displays a wiring position of the wire harness corresponding to the selected wiring procedure selection button so as to be superimposed on the corresponding position in the virtual routing space.

When displaying the wiring position of the wire harness so as to be superimposed on the corresponding position in the virtual routing space, the display means 21 also displays setting position information indicating a longitudinal position of the wire harness that should be set first, and position identification information at plural positions in a longitudinal direction of the wire harness for identification of such positions.

When a wiring procedure selection button corresponding to a wiring route number is selected by the worker, the selection means 22 notifies the display means 21 of the selected wiring procedure selection button.

Operation of the Embodiment

Next, an example of the operation of the present embodiment will be described in reference to FIGS. 2 to 3.

(1) Display of Operation Guide Screen

The worker operates the input section 4 to display an operation guide screen on the display section 5. Based on the operation on the input section 4, the display means 21 displays the operation guide screen on the display section 5.

Figure 2:
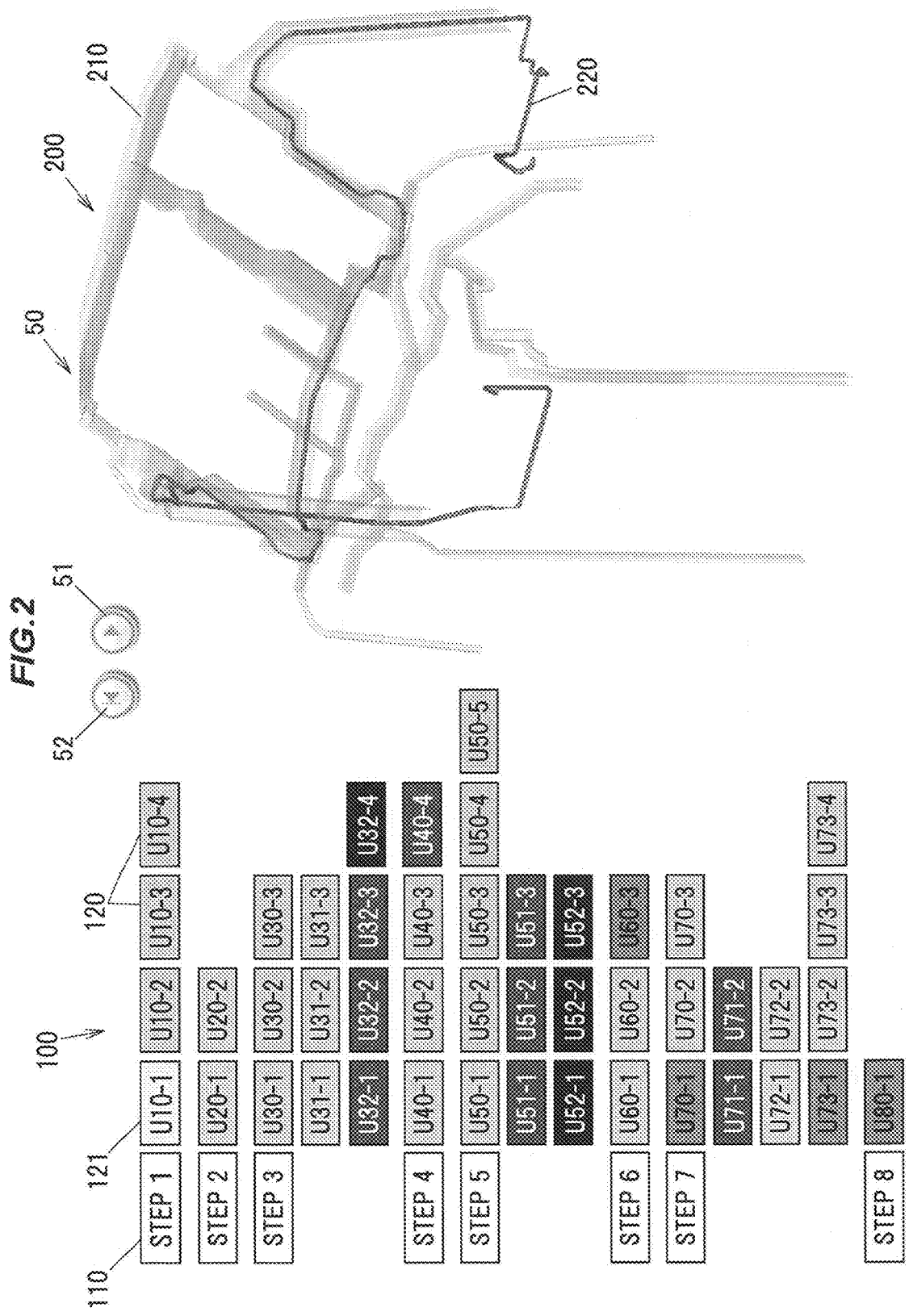
FIG. 2 is a diagram illustrating an example of an operation guide screen displayed by a display means.

FIG. 2 is a diagram illustrating an example of the operation guide screen. An operation guide screen 50 shown in FIG. 2 is configured that a procedure display region 100 is displayed on the left side, a wiring position display region 200 is displayed on the right side, and a forward button 51 for going forward and changing the content displayed on the operation guide screen 50 and a back button 52 for going back and changing the content displayed on the operation guide screen 50 are displayed at the center.

Wiring route numbers 110 indicating the wire harness wiring route order, e.g., "STEP 1" to "STEP 8", are vertically arranged in the procedure display region 100. "STEP 1" is the first wiring route. For each wiring route number 110, one or plural wiring procedure selection buttons 120 are horizontally arranged so as to correspond to the wire harness wiring procedure order. The wiring procedure selection button 120 indicates a wiring procedure, and the wiring procedure corresponding to the wiring procedure selection button 120 located closest to the wiring route number 110 is the first procedure in the wiring operation.

When any wiring procedure selection button 120 is not selected, only a virtual routing space 210 showing all wiring routes of the wire harness is displayed in the wiring position display region 200.

In the procedure display region 100 shown in FIG. 2, the wiring procedure selection buttons 120 "U10-1", "U10-2" . . . are arranged so as to correspond to the wiring route number 110 "STEP 1". The wiring procedure selection buttons 120 "U20-1", "U20-2" are arranged so as to correspond to the wiring route number 110 "STEP 2". The wiring procedure selection buttons 120 "U30-1", "U30-2" . . . , "U31-1", "U31-2" . . . , "U32-1", "U32-2" . . . are arranged so as to correspond to the wiring route number 110 "STEP 3". The wiring procedure selection buttons 120 "U40-1", "U40-2" . . . are arranged so as to correspond to the wiring route number 110 "STEP 4". The wiring procedure selection buttons 120 "U50-1", "U50-2" . . . , "U51-1", "U51-2" . . . , "U52-1", "U52-2" . . . are arranged so as to correspond to the wiring route number 110 "STEP 5". The wiring procedure selection buttons 120 "U60-1", "U60-2" . . . are arranged so as to correspond to the wiring route number 110 "STEP 6". The wiring procedure selection buttons 120 "U70-1", "U70-2" . . . , "U71-1", "U71-2", "U72-1", "U72-2", "U73-1", "U73-2" . . . are arranged so as to correspond to the wiring route number 110 "STEP 7". The wiring procedure selection button 120 "U80-1" is arranged so as to correspond to the wiring route number 110 "STEP 8".

The wiring procedures are arranged so as to be grouped by use of the wire harness, i.e., for DC (direct current), AC (alternate current), shield and grounding. It is arranged so that particularly DC wire harness and AC wire harness are not vertically and horizontally adjacent to each other.

In the example shown in FIG. 2, the buttons used for DC wire harness are "U10-1" to "U10-4" of "STEP 1", "U20-1" and "U20-2" of "STEP 2", "U30-1", "U30-2" . . . and "U31-1", "U31-2" . . . of "STEP 3", "U40-1" to "U40-3" of "STEP 4", "U50-1" to "U50-5" of "STEP 5", "U60-1" and "U60-2" of "STEP 6", and "U70-2", "U70-3", "U72-1", "U72-2", "U73-2" to "U73-4" of "STEP 7".

The buttons used for shield wire harness are "U32-1" to "U32-3" of "STEP 3", "U51-1" to "U51-3" of "STEP 5", and "U71-1", "U71-2" of "STEP 7".

The buttons used for AC wire harness are "U32-4" of "STEP 3", and "U52-1" to "U52-3" of "STEP 5".

The buttons used for grounding wire harness are "U60-3" of "STEP 6", "U70-1", "U73-1" of "STEP 7", and "U80-1" of "STEP 8".

The wiring procedure "U10-1" denoted by a reference numeral 121 is the currently selected wiring procedure selection button 120, i.e., the currently selected wiring procedure.

For example, the worker selects "U10-1" by operating the input section 4. The selection means 22 notifies the display means 21 of the selected wiring procedure "U10-1".

The display means 21 displays in such a manner that a wiring position 220 of the wire harness to be laid in the wiring procedure corresponding to the selected "U10-1" is superimposed on the virtual routing space 210 displayed in the wiring position display region 200. This allows the worker to visually identify the wiring position 220 of the wire harness in relation to the virtual routing space 210.

Next, when the worker operates the forward button 51, the display means 21 displays the next work detail in the wiring position display region 200.

FIG. 3 is a diagram illustrating an example of work detail which should be undertaken in the wiring procedure "U10-1". The display means 21 displays "START", which is setting position information 230 indicating a longitudinal position of the wire harness that should be set first, as well as reference point numbers (e.g., reference point 1, reference point 2, etc.), which are position identification information 240, in the virtual routing space 210.

The worker brings out an actual wire harness and places so that "START" indicated on the actual wire harness is exactly on "START" displayed in the virtual routing space 210. This allows one worker to work on one side of a position displayed as "START" and another worker to work on the other side. The position of "START" on the wire harness is preferably the substantially center of the entire length of the wire harness. When a position to start laying the wire harness is one end, the other end may be greatly misaligned. However, such misalignment can be reduced by setting the substantially center of the entire length of the wire harness to the position to start laying.

After that, the worker lays the wire harness so that the reference point numbers indicated on the actual wire harness match the reference point numbers as an example of the position identification information 240 displayed in the virtual routing space 210. When there are blanching points on the wiring route of the wire harness, the reference point numbers are preferably displayed on the far side of the blanching points. This can prevent the wire harness from being laid in a wrong direction.

When the worker selects the forward button 51, the display means 21 displays connection positions of connectors or terminals at both ends of the wire harness and a connection destination device in the wiring position display region 200 even though illustration is omitted. The worker connects the wire harness to the device while looking at the content displayed in the wiring position display region 200. When the worker selects the back button 52, the display means 21 changes the display in the wiring position display region 200 to go one step back.

Functions and Effects of the Embodiment

The following functions and effects are obtained in the present embodiment.

(a) Since the wiring procedure selection buttons 120 displayed in the procedure display region 100 correspond to the wire harness wiring procedure order, it is possible to visually identify that the current process is which part of the entire procedure.

(b) When the wiring procedure selection button 120 is selected, the corresponding wiring position 220 of the wire harness is superimposed on the virtual routing space displayed in the wiring position display region 200. Therefore, it is possible to visually identify in which part of the virtual routing space the wire harness should be arranged.

(c) Therefore, it is possible to quickly perform a wire harness wiring operation even without being proficient at the task.

(d) For each wire harness, "START" and the reference point numbers are displayed in the virtual routing space. Therefore, it is possible to prevent the wire harness from being misaligned in the longitudinal direction and being laid in a wrong direction.

Other Embodiments

The invention is not intended to be limited to the embodiment described above, and the various kinds of embodiments can be implemented without departing from the gist of the invention. In addition, additions, omissions, changes and substitutions, etc., can be made to the assembling process of the embodiment without departing from the gist of the invention.

INDUSTRIAL APPLICABILITY

The invention is applicable to railway wire harnesses, automobile wire harnesses, aircraft wire harnesses, medical wire harnesses and device wire harnesses, etc.

REFERENCE SIGNS LIST

1 WIRE HARNESS WIRING OPERATION SUPPORT SYSTEM
2 CONTROL UNIT
3 STORAGE UNIT
4 INPUT SECTION
5 DISPLAY SECTION
20 RECEPTION MEANS
21 DISPLAY MEANS

22 SELECTION MEANS
30 WIRE HARNESS WIRING OPERATION PROGRAM
31 3D CAD DATA
32 HARNESS INFORMATION
33 VIRTUAL ROUTING SPACE INFORMATION
34 WIRE HARNESS ROUTE INFORMATION
50 OPERATION GUIDE SCREEN
51 FORWARD BUTTON
52 BACK BUTTON
100 PROCEDURE DISPLAY REGION
110 WIRING ROUTE NUMBER
120 WIRING PROCEDURE SELECTION BUTTON
121 CURRENTLY SELECTED WIRING PROCEDURE SELECTION BUTTON
200 WIRING POSITION DISPLAY REGION
210 VIRTUAL ROUTING SPACE
220 WIRING POSITION OF WIRE HARNESS
230 SETTING POSITION INFORMATION
240 POSITION IDENTIFICATION INFORMATION

The invention claimed is:

1. A wire harness wiring operation support system, comprising:
a display section that comprises a procedure display region for displaying a plurality of wiring procedure selection buttons, each corresponding to a wire harness to be wired, the plurality of wiring procedure selection buttons being provided collectively for each wiring route of a plurality of wiring routes, and a wiring position display region for displaying a wiring position of the wire harness that corresponds to a selected wiring procedure selection button,
wherein at least one of a main body and an interior of the main body is displayed as a three-dimensional information in the wiring position display region,
wherein the wiring position is displayed as a three-dimensional information,
wherein the wiring procedure selection buttons are arranged so as to correspond to an order of procedure for wiring the wire harness,
wherein the wiring procedure selection buttons are displayed in different colors based on a type of the wire harness,
wherein, in a same wiring route, the wiring procedure selection buttons are distinguished by the type of the wire harness, the type of the wire harness including a direct current (DC) wire harness, and one of an alternate current (AC) wire harness and a shield and grounding wire harness,
wherein the wiring procedure selection buttons for the DC wire harness and the one of the AC wire harness and the shield and grounding wire harness are arranged not to be adjacent to each other in vertical and horizontal directions, and
wherein, in the wiring position display region, setting position information indicating a longitudinal position of the wire harness that should be set first is displayed when displaying the wiring position of the wire harness so as to be superimposed on a corresponding position in a virtual routing space.

2. The wire harness wiring operation support system according to claim 1, wherein wiring route numbers indicating an order of the wiring routes for wiring the wire harness are displayed in the wiring position display region.

3. The wire harness wiring operation support system according to claim 1, wherein the display in the wiring position display region is such that the virtual routing space showing all the wiring routes of the wire harness is displayed in the wiring position display region and a wiring route of the wire harness corresponding to the selected wiring procedure selection button is superimposed on the corresponding position in the virtual routing space.

4. The wire harness wiring operation support system according to claim 3, wherein, in the wiring position display region, position identification information is displayed at a plurality of positions in a longitudinal direction of the wire harness for identification of said positions when displaying the wiring position of the wire harness so as to be superimposed on the corresponding position in the virtual routing space.

5. The wire harness wiring operation support system according to claim 1, wherein the plurality of wiring procedure selection buttons displayed in the procedure display region are arranged so as to be grouped by the wire harness to be wired.

6. The wire harness wiring operation support system according to claim 1, wherein connection positions of connectors or terminals provided at both ends of the wire harness and a connection destination device are displayed in the wiring position display region.

7. The wire harness wiring operation support system according to claim 1, wherein the main body includes a body of a vehicle, and the interior of the main body includes structural components of the body of the vehicle.

8. The wire harness wiring operation support system according to claim 7, wherein the body of the vehicle is displayed as the three-dimensional information in the wiring position display region.

9. The wire harness wiring operation support system according to claim 7, wherein the structural components of the body of the vehicle is displayed as the three-dimensional information in the wiring position display region.

10. The wire harness wiring operation support system according to claim 7, wherein the body of the vehicle and the structural components of the body of the vehicle are displayed as the three-dimensional information in the wiring position display region.

11. The wire harness wiring operation support system according to claim 7, wherein the wiring position display region displays the body of the vehicle and the structural components of the body of the vehicle in a three-dimensional virtual space based on the three-dimensional information.

12. The wire harness wiring operation support system according to claim 1, wherein wiring route numbers indicating an order of the wiring routes for wiring the wire harness are vertically displayed in the wiring position display region.

13. The wire harness wiring operation support system according to claim 12, wherein, for each of the wiring route numbers, the wiring procedure selection buttons are horizontally arranged to correspond to the order of the wiring routes for the wiring the wire harness.

14. The wire harness wiring operation support system according to claim 12, wherein the selected wiring procedure selection button indicates a wiring procedure that corresponds to a wiring procedure selection button of the wiring procedure selection buttons located closest to a wiring route number of the wiring route numbers that comprises a first procedure in a wiring operation.

15. A wire harness wiring operation support system, comprising:
a display section that comprises a procedure display region for displaying a plurality of wiring procedure selection buttons, each corresponding to a wire harness to be wired, the plurality of wiring procedure selection buttons being provided collectively for each wiring route of a plurality of wiring routes, and a wiring position display region for displaying a wiring position of the wire harness that corresponds to a selected wiring procedure selection button, wherein the display in the wiring position display region is such that a virtual routing space showing all the wiring routes of the wire harness is displayed in the wiring position display region and a wiring route of the wire harness corresponding to the selected wiring procedure selection button is superimposed on a corresponding position in the virtual routing space, wherein, in the wiring position display region, position identification information is displayed at a plurality of positions in a longitudinal direction of the wire harness for identification of said positions when displaying the wiring position of the wire harness so as to be superimposed on the corresponding position in the virtual routing space, and wherein, in the wiring position display region, setting position information indicating a longitudinal position of the wire harness that should be set first is displayed when displaying the wiring position of the wire harness so as to be superimposed on the corresponding position in the virtual routing space.

\* \* \* \* \*